Feb. 24, 1959 R. J. ROCKWELL 2,875,413
MODULATION SYSTEM
Original Filed Aug. 11, 1954
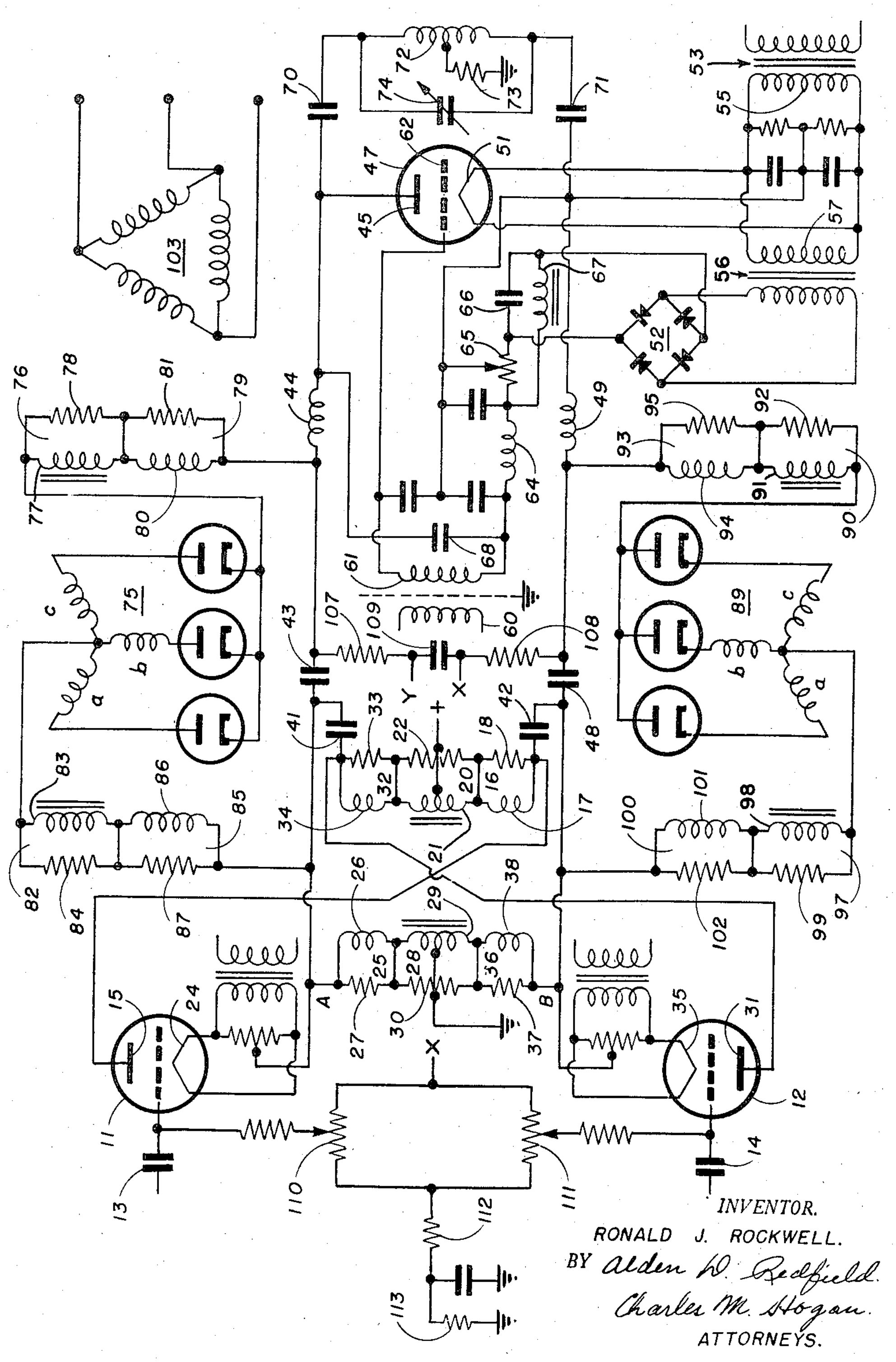
INVENTOR.
RONALD J. ROCKWELL.
BY Alden W. Redfield
Charles M. Hogan
ATTORNEYS.

United States Patent Office 2,875,413

Patented Feb. 24, 1959

2,875,413

MODULATION SYSTEM

Ronald J. Rockwell, Cincinnati, Ohio, assignor to Crosley Broadcasting Corporation, Cincinnati, Ohio, a corporation of Ohio Original application August 11, 1954, Serial No. 449,073, now Patent No. 2,711,512, dated June 21, 1955. Divided and this application April 22, 1955, Serial No. 503,193

11 Claims. (Cl. 332—43)

This invention relates to radio frequency transmitters and, more specifically, to modulation circuits for use in a radio frequency transmitter. The present application is a division of U. S. Patent No. 2,711,512.

High level modulation or plate modulation circuits, i. e., circuits where the high level radio frequency stage is modulated through its anode or plate voltage, usually include a modulation transformer between the audio frequency modulator and the modulated high level radio frequency stage. In such circuits, in order to keep the direct current supply of the radio frequency stage from saturating the modulation transformer core, it usually has been considered necessary to capacitively couple the output or secondary of the modulation transformer to a modulation reactance placed in the direct current plate supply circuit of the radio frequency stage. Inherently, the modulation transformer is in series relationship with any over-all feedback path and, in prior art circuits, this makes it extremely difficult to compensate for distortion arising from limitations of the transformer.

As a result, circuits of this type cannot be relied upon to pass true high fidelity signals. In addition, prior art circuits which utilize a common direct current power source for the audio modulator and the high level radio frequency modulated stage have an inherent design problem arising from the fluctuations in the power drain of the modulator stage which, when reflected into the plate supply voltage of the radio frequency modulated stage, cause undersirable carrier shift, i. e., a shift in the carrier power output.

It would be desirable to supply a modulating system of the high level modulation type which eliminates the conventional modulation transformer, minimizes carrier shift, and transmits a very high fidelity signal.

Thus, it becomes an object of my invention to provide a high level modulation system, primarily using capacitive coupling between the modulator and the modulated stage.

It is a further object of this invention to provide a modulation system using a separate source of R. F. amplifier supply voltage to minimize carrier shift.

It is also an object of my invention to provide a transformerless modulator circuit which is coupled to modulate both the anode and the cathode circuits of a high level radio frequency modulated stage.

Briefly, my invention comprises a modulator system having a high level modulated stage capacitively coupled for anode and cathode modulation to the output of the modulator stage. My system eliminates the need for a modulator output transformer, making it possible to utilize audio and radio frequency chokes in simple circuitry so as to obtain a true high fidelity modulated signal.

In the single figure disclosing the preferred embodiment of my invention, I show a two-tube modulator amplifier stage including tubes 11 and 12. The anode 15 of modulator tube 11 is coupled to an anode potential supply source, not shown, through an air core filter choke 16, comprising coil 17 and damping resistor 18, and one-half of an iron core inductor 20, comprising coil 21 and damping resistor 22. The cathode 24 of modulator tube 11 is coupled through an air core filter choke 25, comprising coil 26 and damping resistor 27, and on to ground through one-half of an iron core inductor 28, comprising coil 29 and resistor 30. The anode 31 of modulator tube 12 is connected to a source of anode potential, not shown, in symmetrical fashion through a filter choke 32, comprising resistor 33 and coil 34 and one-half of inductor 20. Symmetrically, cathode 35 is connected to ground through one-half of inductor 28 and an open air filter choke 36, comprising resistor 37 and coil 38.

Anode 31 of modulator tube 12 is coupled to cathode 24 of modulator tube 11 through capacitor 41. In symmetrical fashion, anode 15 of modulator tube 11 is coupled to cathode 35 of modulator tube 12 through capacitor 42. The output of the modulator is taken from across the series-connected cathode inductances of the two tubes 11 and 12, i. e., coils 26, 29 and 38. The cathode 24 side of the output inductance is coupled through capacitor 43 and radio frequency filter choke 44 to anode 45 of the radio frequency amplifier tube 47. The cathode 35 side of the modulator output inductance is coupled through capacitor 48 and radio frequency filter choke 49 to cathode 51 of the radio frequency amplifier 47.

Bias voltage is supplied to the grid-cathode circuit of radio frequency amplifier 47 through a copper oxide full wave rectifier circuit 52. Transformer 56, having a primary 57 which is tapped across the secondary 55 of filament transformer 53, supplies alternating current directly to rectifier circuit 52.

Radio frequency carrier signals are taken from a source, not shown, and fed through coupling transformer primary 60 to shielded secondary 61, which has one terminal coupled directly to grid 62 of amplifier 47 and its other terminal coupled to cathode 51 through radio frequency choke 64 and potentiometer 65. Capacitor 66 and coil 67 act to filter the output of rectifier 52 and reduce or minimize any alternating current ripple which otherwise would be present. Capacitor 68 is coupled between the anode 45 of radio frequency amplifier 47 and the lower side of transformer secondary 61 to act as a neutralizing signal feedback path, compensating for inherent plate-to-grid capacitive coupling in the amplifier. Additional bias, during operation, is supplied by grid rectificaton of the radio frequency signal fed to grid 62.

The modulated output of radio frequency amplifier 47 is taken from across the anode-cathode path of the amplifier through coupling capacitors 70 and 71 to a load circuit which may comprise a tuned transformer primary, including tuning capacitor 74 and coil 72 which is center-tapped to ground through a resistor 73.

Direct current plate-cathode voltage for the radio frequency amplifier is supplied by two separate three-phase rectifier circuits 75 and 89, each being directly coupled across one of the capacitors coupling the modulator to the radio frequency amplifier. Rectifier 75 comprises a three-phase star-connected secondary having a separate diode in each of the three secondary windings. The positive terminal of rectifier 75 is coupled through iron core choke 76, which comprises a coil 77 and damping resistor 78, and an air core filter choke 79 comprising coil 80 and resistor 81 to the radio frequency amplifier anode side of capacitor 43. The negative terminal of rectifier 75 is connected to the modulator output side of capacitor 43 through iron core choke 82, comprising a coil 83 and damping resistor 84, and filter choke 85, comprising coil 86 and damping resistor 87.

Three-phase rectifier 89 is coupled across capacitor 48 in symmetrical fashion. The negative polarity terminal of rectifier 89 is coupled to the radio frequency amplifier 47 cathode side of capacitor 48 through iron core filter choke 90, comprising coil 91 and damping resistor 92, and filter choke 93, comprising a coil 94 and damping resistor 95. The positive polarity terminal of rectifier 89 is coupled to the cathode 35 side of capacitor 48 through an iron core choke 97, comprising a coil 98 and damping resistor 99, and filter choke 100, comprising a coil 101 and damping resistor 102. The three-phase transformer secondary windings supplying rectifiers 75 and 89 are wound on common cores and are magnetically coupled to a common transformer primary, such as delta-connected primary 103, shown schematically.

Resistors 107 and 108, when connected in series with a capacitor, such as capacitor 109, and in shunt across the modulator output, form a highly satisfactory source of bias potential. Modulator tubes 11 and 12 may be biased by a negative potential taken from the junction of resistor 108 and capacitor 109. This negative potential is coupled through a pair of parallel-connected potentiometers 110 and 111 and to ground through series resistors 112 and 113. Potentiometers 110 and 111 act as controllable bias sources for the grids of capacitor tubes 11 and 12, respectively. Positive bias or direct current anode supply voltages are taken from the junction of resistor 107 and capacitor 109 and fed to loads, not shown. In actual practice, I use this source of positive potential for driver tube supply in the modulator. For best results these loads should draw approximately equal current flow through resistors 107 and 108.

*Operation*

Modulator tubes 11 and 12 are both biased approximately at cutoff, and radio frequency amplifier 47 is biased for class C operation. Audio signals are fed through coupling capacitors 13 and 14 to drive the control grids of the modulator tubes. The audio signal on the grid of modulator tube 11 can be considered to be 180° out of phase with the audio signal on the grid of modulator tube 12. However, since only one of the modulator tubes is producing output signals at any given instant, the signals on the grids of the modulator tubes need not be perfectly symmetrical. That is, it is unnecessary to use undistorted audio signals to cut off either modulator tube during the portions of the cycle when the other modulator tube is producing the useful output.

Assuming that an audio signal, which at the instant in question is just starting a positive going excursion, is impressed on the input circuit of modulator tube 11, and that the phase-inverted version of the same audio signal which is impressed on the control grid of modulator tube 12 is just starting a negative going excursion, it can be seen that the negative signal on the control grid of modulator tube 12 will drive this tube to cutoff and that the positive going signal on the grid of modulator tube 11 will allow current to flow between anode 15 and cathode 24, thereby increasing the voltage on modulator output terminal A, due to the current flowing through air core inductance 25 and the upper half of iron core inductor network 28. Since modulator tube 12 is cut off, the voltage on output terminal B is controlled by the voltage on anode 15 of modulator tube 11 by virtue of the coupling action of capacitor 42. Thus, it can be seen that a positive signal excursion on the control grid of modulator tube 11 effects a positive signal excursion on output terminal A and an equal and opposite negative signal excursion on output terminal B.

When the audio signal passes through its alternating current axis so as to drive the control grid of modulator tube 12 with a positive going signal excursion, modulator tube 11 is cut off by a negative signal excursion on its grid, and the voltage on the output terminals A and B results from current flow through modulator tube 12 alone. During this portion of the cycle the voltage on output terminal B increases in the positive going direction because of modulator tube 12 anode-cathode current flow through air core inductance 36 and the lower portion of iron core inductor network 28. The negative voltage excursion on anode 31 is coupled to output terminal A through capacitor 41, and thus the negative voltage excursion on terminal A is equal and opposite to the positive going excursion on terminal B during this part of the cycle. As the audio signal passes through its alternating current axis, a second complete cycle is started and modulator tube 12 is cut off while modulator tube 11 again controls the voltage on the modulator output terminals A and B. Thus, it can be seen that the voltages on the anode and cathode of the operating tube, i. e., the tube carrying signal at any given instant, controls both the positive and negative signal excursions on the output terminals A and B during the instant in question.

The audio output from the modulator drives the radio frequency amplifier stage comprising triode 47 which is biased for class C operation. Direct current plate potential for the modulated stage is supplied from two three-phase, half-wave rectifier circuits 75 and 89 which are symmetrical, except that the "star" connected secondaries in rectifier 75 are connected to the anode of the three rectifying diodes, while in rectifier 89 the "star" connected secondaries are connected to the cathode of the three diodes. Thus, the rectifiers are polarized in such manner as to provide a direct current anode potential source for amplifier 47 which comprises the sum of the two rectified voltages with ripple voltages adding in quadrature in the same manner as in a conventional full-wave, three-phase rectifier.

Choke circuits 76, 79, 82, 85, 90, 93, 97 and 100 are inserted in the rectifier connections to choke out audio frequency signals and higher frequencies from the rectifier circuits, per se, and to increase the impedances to ground from the signal channel through the rectifiers' capacitance to ground so as to minimize signal loss. Though not shown, other than by letter designations *a*, *b* and *c*, each coil of the transformer included in rectifier circuit 75 is wound on a core in common with a similar winding of the transformer included in rectifier 89. These windings are so poled on each core as to minimize the core saturation which would result if each separate core had only one winding. The signals of audio frequency are taken from output terminals A and B and capacitively coupled to the high level modulated stage 47 through capacitors 43 and 48. Alternating current may be supplied to the "star" connected secondaries and rectifiers 75 and 89 from a delta-connected primary 103 which, in turn, is connected to a source of three-phase alternating current in the usual manner.

Radio frequency filter chokes 44 and 49 act to isolate both the rectifier circuits and the modulator output from the radio frequency carrier signals. Thus, the modulated stage has an anode-cathode voltage which, in the absence of a signal across the modulator output terminal, is supplied by the rectifier output voltages. When a signal is impressed across modulator output terminals A and B, the anode-cathode voltage across the high level modulated stage includes this audio signal in series with the rectifier voltages. As a result, both the anode and cathode voltages of the modulated stage are varied in accordance with the audio signal output of the modulator to provide anode modulation and simultaneous equal and opposite cathode modulation.

The radio frequency carrier is supplied to the transformer primary 60 from a source, not shown, and is magnetically coupled to transformer secondary 61 to drive the grid of the modulated tube 47. Bias is supplied to the grid circuit of tube 47 through filament transformer 53 and transformer 56 which, in turn, supplies full wave rectifier 52. The class C operating bias potential is controlled by potentiometer 65 which is connected across the output of rectifier 52.

The actual operating bias voltage is produced by rectification of the radio frequency carrier signal in the grid 62, cathode 51 path of amplifier 47. The resulting change produced on the capacitor coupled across the variable portion of potentiometer 65 acts effectively as the operating bias source. The fixed bias voltage in series therewith which is produced by rectifier 52 is low enough so as to enter into circuit operation primarily during quiescent or no-signal periods, i. e., periods when the radio frequency carrier signal is interrupted, as a protective measure.

The ratio between the fixed bias voltage and the variable bias voltage across potentiometer 65, when adjusted properly, allows amplifier 47 to operate within essentially linear characteristics. Adjustment of the fixed bias to variable bias ratio is made possible by potentiometer 65. Thus, the grid of amplifier 47 is driven by a voltage at carrier frequency, and the anode and cathode are driven by a voltage at the audio frequency. The resultant modulated output is then taken from across the anode-cathode path of tube 47 through coupling capacitors 70 and 71 and fed to a transformer primary winding 72 which is center-tapped to ground through resistor 73 and tuned by variable capacitor 74.

Neutralizing capacitor 68, which is connected between anode 45 of the modulated amplifier 47 and the cathode side of transformer secondary 61, feeds back a bucking signal which is effectively 180° out of phase with signals coupled to the grid 62 through the inherent anode-to-grid capacitance of the tube.

Resistors 107 and 108 in conjunction with capacitor 109 form a means for extracting direct current bias potential from the output of the system without appreciably loading the alternating current signal path. As has been stated, during the instant when modulator output terminal A is starting a positive voltage excursion, modulator output terminal B is starting a negative voltage excursion. Likewise, when modulator terminal B is starting a positive voltage excursion, terminal A is starting a negative voltage excursion. Thus, the junction between resistors 107 and 108 remains at a relatively constant potential relative to ground with the terminal A side of resistor 107 moving away from the system ground potential in an equal and opposite signal amplitude polarity direction from the voltage at the terminal B side of resistor 108. Capacitor 109 effectively ties resistors 107 and 108 together from an alternating current viewpoint and effectively blocks direct current flow from terminal A to terminal B through this network.

If resistors 107 and 108 are selected to have sufficient resistance, or if chokes are included to provide sufficient alternating current impedance, the alternating current signal loss through this network can be held to a minimum. Terminal X on the capacitor 109 side of resistor 108 then may be used to supply a bias source for modulator tubes 11 and 12 through potentiometers 110 and 111 and resistors 112 and 113 to ground. A positive load may be taken from terminal Y at the junction of resistor 107 and capacitor 109 to supply driver stage anode currents. The direct current drop through resistor 107 should be maintained substantially equal to the direct current flow through 108. Little, if any, distortion results in the output of the modulator system arising from this load network.

Coupling capacitors 41 and 42 act not only as coupling capacitors fundamental to circuit operation, but also as filtering capacitors. As can be seen, these capacitors are effectively connected across the cathanode amplifier supply source in parallel, except for the relatively low impedances of the anode and cathode circuits of the cathanode amplifier, and thus form a bypass for any alternating current ripple present in the supply source.

While I do not desire to be limited to any specific circuit parameters, such parameters varying in accordance with individual designs, the following circuit values have been found entirely satisfactory in one successful embodiment of the invention:

| | |
|---|---|
| Tubes 11 and 12 | 9C28A (Federal). |
| 47 | 5681 (Machlett). |
| Rectifiers 75 and 89 | AR63 (English Electric). |
| Resistors 18, 27, 33, 37 | 20,000 ohms. |
| 22, 30 | 40,000 ohms. |
| 78, 81, 84, 87, 92, 95, 99, 102 | 20,000 ohms. |
| 107, 108 | 7000 ohms. |
| Inductances 21 | 75 henries. |
| 29 | 25 henries. |
| Capacitors 41, 42, 43, 48 | 30 microfarads. |
| 109 | 20 microfarads. |
| Power Supply B+ | 15,000 volts. |
| Rectifiers 75, 89 | 6,000 volts. |

While there has been shown and described what is at present considered the preferred embodiment of the invention, it will be obvious to those skilled in the art that various changes and modifications may be made therein without departing from the invention as defined by the appended claims.

Having thus described my invention, I claim:

1. In a modulator circuit, the combination comprising a modulator output inductor center-tapped to ground and having two end terminals, an audio amplifier coupled to said inductor for developing an audio signal across each half of the output inductor which is 180 degrees out of phase with the audio signal across the other half of the output inductor, an amplifier having an anode, a cathode and a control grid, means biasing said control grid relative to said cathode to provide class C amplifier operation, a first capacitor coupling said amplifier anode to one end terminal of said output inductor, a second capacitor coupling the cathode of said amplifier to the remaining end terminal of said output inductor, a source of direct current voltage coupled across said first coupling capacitor polarized to make the inductor terminal side of the capacitor negative relative to the amplifier anode side of said capacitor, a second source of direct current voltage coupled across the second coupling capacitor polarized to make the inductor terminal side of the second capacitor positive relative to the amplifier cathode side of said second capacitor, and a source of radio frequency carrier signals coupled to the grid of said class C biased amplifier.

2. In a modulator circuit, the combination comprising a modulator output inductor center-tapped to ground and having two end terminals, an audio amplifier comprising two electron tubes, each having at least an anode, a cathode and a control grid, a source of audio signals coupled to said grids, means directly coupling the cathodes of said tubes and capacitively coupling the anodes of said tubes to said inductor for developing an audio signal across each half of the output inductor which is 180 degrees out of phase with the audio signal across the other half of the output inductor, an amplifier having an anode, a cathode and a control grid, means biasing said control grid relative to said cathode to provide class C amplifier operation, a first capacitor coupling said amplifier anode to one end terminal of said output inductor, a second capacitor coupling the cathode of said amplifier to the remaining end terminal of said output inductor, a source of direct current voltage coupled across said first coupling capacitor polarized to make the inductor terminal side of the capacitor negative relative to the amplifier anode side of said capacitor, a second source of direct current voltage coupled across the second coupling capacitor polarized to make the inductor terminal side of the second capacitor positive relative to the amplifier cathode side of said second capacitor, and a source of radio frequency carrier signals coupled to the grid of said class C biased amplifier.

3. In a modulator circuit, the combination comprising a modulator output impedance center-tapped to ground and having two end terminals, an audio amplifier coupled to said impedance for developing an audio signal across each half of the output impedance which is 180 degrees out of phase with the audio signal across the other half of the output impedance, an amplifier having an anode, a cathode and a control grid, means biasing said control grid relative to said cathode to provide class C amplifier operation, a first capacitor coupling said amplifier anode to one of said end terminals, a second capacitor coupling the cathode of said amplifier to the remaining end terminal, a source of direct current voltage coupled across said first coupling capacitor polarized to make the output terminal side of the capacitor negative relative to the amplifier anode side of said capacitor, a second source of direct current voltage coupled across the second coupling capacitor polarized to make the output terminal side of the second capacitor positive relative to the amplifier cathode side of said second capacitor, and a source of radio frequency carrier signals coupled to the grid of said class C biased amplifier.

4. In a modulator circuit, the combination comprising a modulator output impedance center-tapped to ground and having two end terminals, an audio amplifier coupled to the output terminals of said impedance for developing an audio signal across each half of the output impedance which is 180 degrees out of phase with the audio signal across the other half of the output impedance, an amplifier having an anode, a cathode and a control grid, means biasing said control grid relative to said cathode to provide class C amplifier operation, a first capacitor coupling said amplifier anode to one of said end terminals, a second capacitor coupling the cathode of said amplifier to the remaining end terminal, a source of direct current voltage comprising a half wave rectifier coupled across said first coupling capacitor and polarized to make the output terminal side of the capacitor negative relative to the amplifier anode side of said capacitor, a second source of direct current voltage comprising a half wave rectifier coupled across the second coupling capacitor and polarized to make the output terminal side of the second capacitor positive relative to the amplifier cathode side of said second capacitor, said half wave rectifiers being phased to produce quadrature ripple voltages, and a source of radio frequency carrier signals coupled to the grid of said class C biased amplifier.

5. In a signal translating circuit, the combination comprising a symmetrical impedance having two ungrounded end terminals, means coupled to said impedance for developing 180 degree phase displaced audio signals at said end terminals, a radio frequency stage having at least an anode, a cathode, and a control electrode, coupling means including a source of direct current in series between one of said terminals and said anode and polarized to make said anode positive with respect to one impedance terminal, and coupling means including a source of direct current in series between said cathode and the other of said terminals and polarized to make said cathode negative with respect to the other impedance terminal.

6. In a signal translating circuit, the combination comprising a symmetrical impedance having two ungrounded end terminals and a center tap, means coupled to said impedance for developing 180 degree phase displaced audio signals at said end terminals, a radio frequency stage having at least an anode, an ungrounded cathode, and a control electrode, and means for coupling said terminals to said anode and cathode including at least one direct current potential source in series with the whole of said impedance and the anode current path of said radio frequency stage and connected between a terminal of said impedance and an electrode of said stage so as to polarize the radio frequency stage anode positive and its cathode negative, said impedance isolating said cathode from said center tap.

7. A signaling circuit comprising a pair of ungrounded output terminals, two audio signal sources balanced to ground and so arranged that one of the sources develops equal and oppositely polarized voltages at said output terminals during the first half of a representative input cycle and the second source develops equal and opposite voltages of reversed polarity at said output terminals during the second half of a representative input cycle, a signal translating stage which requires anode current, means for supplying direct current power to the anode of said signal translating stage, means for supplying direct current power to the cathode of said signal translating stage, and means for connecting in series said output terminals, the anode current path of said signal translating stage and said power sources, whereby said means for supplying direct current power supplies anode current to said signal translating stage while intercoupling said output terminals thereto, said cathode being ungrounded.

8. The combination of first and second vacuum tubes each having anode and cathode and control electrodes, means for biasing said tubes for class B operation, a source of push-pull signals connected to said control electrodes, a pair of output terminals, an impedance having a center tap and connected between said anodes, a source of anode voltage connected between said center tap and a point of reference potential, means for connecting said point separately to the cathodes of said tubes, means for coupling the anode of one of said tubes and the cathode of the other tube to one of said terminals, means for coupling the anode of the other of said tubes and the cathode of said one tube to the other of said terminals, whereby each tube supplies current to said impedance on alternate half cycles, a third vacuum tube having anode and cathode and control electrodes, first coupling means including a direct current voltage source in series between one of said terminals and the last-named anode, and second coupling means including a direct current voltage source in series between the other terminal and the last-named cathode, said voltage sources being polarized to render the anode of said third tube positive relative to its cathode.

9. The combination of first and second vacuum tubes each having anode and cathode and control electrodes, means for biasing said tubes for class B operation, a source of push-pull signals connected to said control electrodes, a pair of output terminals, an impedance having a center tap and connected between said cathodes, means for separately connecting said anodes to a common point, a source of anode voltage connected between said center tap and said common point, means for coupling the anode of one of said tubes and the cathode of the other tube to one of said terminals, means for coupling the anode of the other of said tubes and the cathode of said one tube to the other of said terminals, whereby each tube supplies current to said impedance on alternate half cycles, a third vacuum tube having anode and cathode and control electrodes, first coupling means including a direct current voltage source in series between one of said terminals and the last-named anode, and second coupling means including a direct current voltage source in series between the other terminal and the last-named cathode, said voltage sources being polarized to render the anode of said third tube positive relative to its cathode.

10. The combination of first and second vacuum tubes each having anode and cathode and control electrodes, means for biasing said tubes for class B operation, a source of push-pull signals connected to said control electrodes, a pair of output terminals, an impedance having a center tap and connected between said anodes, an impedance having a center tap and connected between said cathodes, a source of anode voltage connected between said center taps with its positive terminal connected to the anode impedance center tap and its negative terminal in circuit with the cathode impedance center tap, means for coupling the anode of one of said tubes and the cathode of the other tube to one of said terminals, means for coupling the anode of the other of said tubes and the cathode of said one tube to the other of said terminals, whereby each tube supplies current to said impedances on alternate half cycles, a third vacuum tube having anode and cathode and control electrodes, first coupling means including a direct current voltage source in series between one of said terminals and the last-named anode, and second coupling means including a direct current voltage source in series between the other terminal and the last-named cathode, said voltage sources being polarized to render the anode of said third tube positive relative to its cathode.

11. The combination in accordance with claim 10, and means to supply radio frequency currents to the control electrode of the third tube, both anode and cathode of said third tube being modulated by signals from said output terminals.

References Cited in the file of this patent

UNITED STATES PATENTS

| | | |
|---|---|---|
| 2,169,019 | Bohm et al. | Aug. 8, 1939 |
| 2,235,549 | Dome | Mar. 18, 1941 |
| 2,569,948 | Polonsky | Oct. 2, 1951 |